US009785568B2

(12) United States Patent
Vajapeyam (10) Patent No.: US 9,785,568 B2
(45) Date of Patent: Oct. 10, 2017

(54) CACHE LOOKUP BYPASS IN MULTI-LEVEL CACHE SYSTEMS

(71) Applicant: Empire Technology Development LLC, Wilmington, DE (US)

(72) Inventor: Sriram Vajapeyam, Bangalore (IN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 92 days.

(21) Appl. No.: 14/715,114

(22) Filed: May 18, 2015

(65) Prior Publication Data
US 2015/0331804 A1    Nov. 19, 2015

(30) Foreign Application Priority Data

May 19, 2014  (IN) .......................... 2476/CHE/2014

(51) Int. Cl.
*G06F 12/08* (2016.01)
*G06F 12/0897* (2016.01)
(Continued)

(52) U.S. Cl.
CPC ........ *G06F 12/0897* (2013.01); *G06F 12/084* (2013.01); *G06F 12/0808* (2013.01); *G06F 12/0811* (2013.01); *G06F 12/0833* (2013.01); *G06F 12/0888* (2013.01); *G06F 2212/1016* (2013.01); *G06F 2212/283* (2013.01); *G06F 2212/314* (2013.01);
(Continued)

(58) Field of Classification Search
None
See application file for complete search history.

(56) References Cited

U.S. PATENT DOCUMENTS 5,625,793 A    4/1997 Mirza
6,219,760 B1   4/2001 McMinn
(Continued)

FOREIGN PATENT DOCUMENTS

EP    2339473 A1    6/2011

OTHER PUBLICATIONS

Basu, A., et al., "Reducing Memory Reference Energy with Opportunistic Virtual Caching," Proceedings of the 39th Annual International Symposium on Computer Architecture, vol. 40, No. 3, pp. 297-308 (Jun. 2012).
(Continued)

*Primary Examiner* — Mano Padmanabhan
*Assistant Examiner* — Jean Edouard
(74) *Attorney, Agent, or Firm* — Moritt Hock & Hamroff LLP; Steven S. Rubin, Esq.

(57) ABSTRACT

Techniques described herein are generally related to retrieval of data in computer systems having multi-level caches. The multi-level cache may include at least a first cache and a second cache. The first cache may be configured to receive a request for a cache line. The request may be associated with an instruction executing on a tile of the computer system. A suppression status of the instruction may be determined by a first cache controller to determine whether look-up of the first cache is suppressed based upon the determined suppression status. The request for the cache line may be forwarded to the second cache by the first cache controller after the look-up of the first cache is suppressed.

23 Claims, 5 Drawing Sheets

(51) Int. Cl.
*G06F 12/0888* (2016.01)
*G06F 12/0811* (2016.01)
*G06F 12/084* (2016.01)
*G06F 12/0831* (2016.01)
*G06F 12/0808* (2016.01)

(52) U.S. Cl.
CPC .. *G06F 2212/6046* (2013.01); *G06F 2212/62* (2013.01); *Y02B 60/1225* (2013.01)

(56) References Cited

U.S. PATENT DOCUMENTS

| | | | |
|---|---|---|---|
| 7,228,388 B2 | 6/2007 | Hu et al. | |
| 7,467,377 B2 | 12/2008 | Wu et al. | |
| 7,509,484 B1* | 3/2009 | Golla | G06F 9/3802 712/203 |
| 7,890,699 B2 | 2/2011 | Comparan et al. | |
| 8,327,187 B1* | 12/2012 | Metcalf | G06F 15/16 714/10 |
| 8,738,860 B1 | 5/2014 | Griffin | G06F 12/0897 711/122 |
| 2002/0188805 A1* | 12/2002 | Kottapalli | G06F 12/0897 711/119 |
| 2006/0143384 A1* | 6/2006 | Hughes | G06F 12/0833 711/130 |
| 2006/0179240 A1 | 8/2006 | Chatterjee et al. | |
| 2006/0224833 A1* | 10/2006 | Guthrie | G06F 12/0811 711/141 |
| 2008/0104329 A1 | 5/2008 | Gaither et al. | |
| 2008/0195831 A1* | 8/2008 | Tsukamoto | G06F 3/0611 711/167 |
| 2011/0161594 A1 | 6/2011 | Kiyota | |
| 2012/0246446 A1* | 9/2012 | Solihin | G06F 9/30 712/205 |
| 2013/0246708 A1* | 9/2013 | Ono | G06F 12/0862 711/122 |
| 2013/0262778 A1* | 10/2013 | Ghai | G06F 12/121 711/136 |
| 2014/0129773 A1* | 5/2014 | Habermann | G06F 12/0811 711/122 |
| 2014/0136784 A1* | 5/2014 | Colglazier | G06F 12/123 711/122 |

OTHER PUBLICATIONS

Hameed, R., et al., "Understanding Sources of Inefficiency in General-Purpose Chips," Proceedings of the 37th annual international symposium on Computer architecture, vol. 38, No. 3, pp. 37-47 (Jun. 2010).

Nicolaescu, D., et al., "Fast Speculative Address Generation and Way Caching for Reducing L1 Data Cache Energy," International Conference on Computer Design, 2006. ICCD 2006, pp. 101-107 (2006).

Zebchuk, J., and Moshovos, A., et al., "RegionTracker: Using Dual-Grain Tracking for Energy Efficient Cache Lookup," Workshop on Complexity Effective Design, co-located with the Int'l Symp. on Computer Architecture, pp. 1-10 (2006).

* cited by examiner

FIG. 5 ized. Data used in execution of single and multiple thread applications may be stored across multi-level caches of the cores of the multi-core processors. During operation, such data may be accessed from the cached locations.
CACHE LOOKUP BYPASS IN MULTI-LEVEL CACHE SYSTEMS

CROSS REFERENCE TO RELATED APPLICATION

This Application claims priority under 35 U.S.C. §119(a) to Indian Patent Application No. 2476/CHE/2014, filed on May 19, 2014. The disclosure of Indian Patent Application No. 2476/CHE/2014 is hereby incorporated herein by reference in its entirety.

BACKGROUND

Unless otherwise indicated herein, the approaches described in this section are not prior art to the claims in this application and are not admitted to be prior art by inclusion in this section.

Many modern computing systems utilize multi-core processors having two or more cores interfaced for enhanced performance and efficient processing of multiple tasks and threads. Data used in execution of single and multiple thread applications may be stored across multi-level caches of the cores of the multi-core processors. During operation, such data may be accessed from the cached locations.

During operation, a memory reference such as for a LOAD or a STORE instruction, may be looked-up in a primary cache such as a level one (L1) cache of the computing system. Additionally, the memory reference may also be looked-up in a secondary cache such as a level two (L2) cache, for example when there is a cache miss in the primary cache. Such cache look-ups in multi-core processors can consume a significant amount of power.

Further, access latency to lower level caches of the cache hierarchy in multi-level caches can affect performance of the multi-level cache systems. For example, on-chip interconnect latency of multi-level caches may increase as the number of cores increase in such systems and may lead to increase in overall energy consumption.

SUMMARY

The following summary is illustrative only and is not intended to be in any way limiting. In addition to the illustrative aspects, embodiments, and features described above, further aspects, embodiments, and features will become apparent by reference to the drawings and the following detailed description.

Techniques described herein are generally related to data retrieval in computer systems with multi-level caches. The various described techniques may be applied to methods, systems, devices or combinations thereof. Some described computer systems may include a core (or multiple cores) and a multi-level cache. The core (or cores) may be configured to execute one or more instructions. The multi-level cache may generally include at least a first cache and a second cache. The first cache may be configured to receive a request for a cache line, where the request may be associated with an instruction executed on the core. A first cache controller may be associated with the first cache. The first cache controller may be configured to determine a suppression status of the instruction, and to forward the request for the cache line to the second cache based upon the determined suppression status.

According to some examples of the present disclosure, various methods related to retrieval of data in a computer system with a multi-level cache are described. The multi-level cache for such described methods may generally include at least a first cache and a second cache. Some example methods may include identifying a request for a cache line. The request may be associated with an instruction executing on a tile (or multiple tiles) of the computer system. A suppression status of the instruction may be determined by a first cache controller to determine whether look-up of the first cache is suppressed. The request for the cache line may be forwarded to the second cache after the look-up of the first cache is determined to be suppressed.

According to additional examples of the present disclosure, additional methods related to retrieving data in a computer system having a multi-level cache are described. The multi-level cache for such described methods may generally include at least a first cache and a second cache. Some example methods may include executing one or more instructions on a tile (or multiple tiles) of the computer system. A request for a cache line may be received by the first cache of the multi-level cache. The request may be associated with the one or more instructions executing on the tile. A suppression status of the instruction may be determined to determine whether look-up of the first cache is suppressed. The request for the cache line may be forwarded to the second cache when the look-up of the first cache is determined to be suppressed. Data associated with the cache line may be retrieved from the second cache.

According to still further examples of the present disclosure, computer systems having a multi-level cache are described. Some example computer systems may include a core (or multiple cores) configured to execute one or more instructions. Some other example computer systems may include a multi-level cache. The multi-level cache may generally include at least a first cache and a second cache. The multi-level cache may be configured to receive a request for a cache line. The request may be associated with an instruction executed on the core. A first cache controller may be associated with the first cache. The first cache controller may be configured to determine a suppression status of the instruction and to forward the request for the cache line to the second cache based upon the determined suppression status.

According to other examples of the present disclosure, a tile is generally described. In various examples, the tile may include a plurality of cores. In some examples, each core may be configured to execute one or more instructions. In some other examples, each of the plurality of cores may include a multi-level cache that includes at least a first cache and a second cache. In various examples, the multi-level cache may be configured to receive a request for a cache line. In some examples, each of the plurality of cores may further include a first cache controller associated with the first cache. In some examples, the first cache controller may be configured to determine a suppression status of the instruction and to forward the request for the cache line to the second cache.

According to still further examples of the present disclosure, non-transitory computer readable mediums are described. Some example non-transitory computer readable mediums may include computer-executable instructions stored thereon that are executable by a processor to perform or cause to be performed various methods to retrieve data in a computer system with a multi-level cache. Example methods may include identifying a request for a cache line by a first cache of the multi-level cache. The request may be associated with an instruction executing on a tile (or multiple tiles) of the computer system. A suppression status of the instruction may be evaluated by a first cache controller to determine whether look-up of the first cache is suppressed. The request for the cache line may be forwarded to a second cache of the multi-level cache when the look-up of the first cache is determined to be suppressed.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. Some aspects of the present disclosure, as generally described herein, and illustrated in the Figures, may be arranged, substituted, combined, separated, and designed in a wide variety of different configurations, all of which are explicitly contemplated herein.

Example embodiments of the present disclosure are generally directed to techniques for data retrieval in computer systems with multi-level caches. The computer systems may generally include at least a first cache and a second cache. A request for a cache line may be received by the first cache and a suppression status may be determined by a first cache controller associated with the first cache by determining the suppression bit associated with the instruction corresponding to the request. The first cache controller may be configured to determine when look-up of the first cache is suppressed based upon the determined suppression status. The first cache controller may be further configured to forward the request for the cache line to the second cache while bypassing the first cache. The cache line may then be retrieved from the second cache. The various techniques described herein may improve cache hierarchy performance of the multi-level cache systems by reducing unnecessary power-consuming lookups of individual caches. In some examples, the technique may be used for data retrieval in computer systems with a main memory and a single cache (such as a level-one cache).

Figure 1:
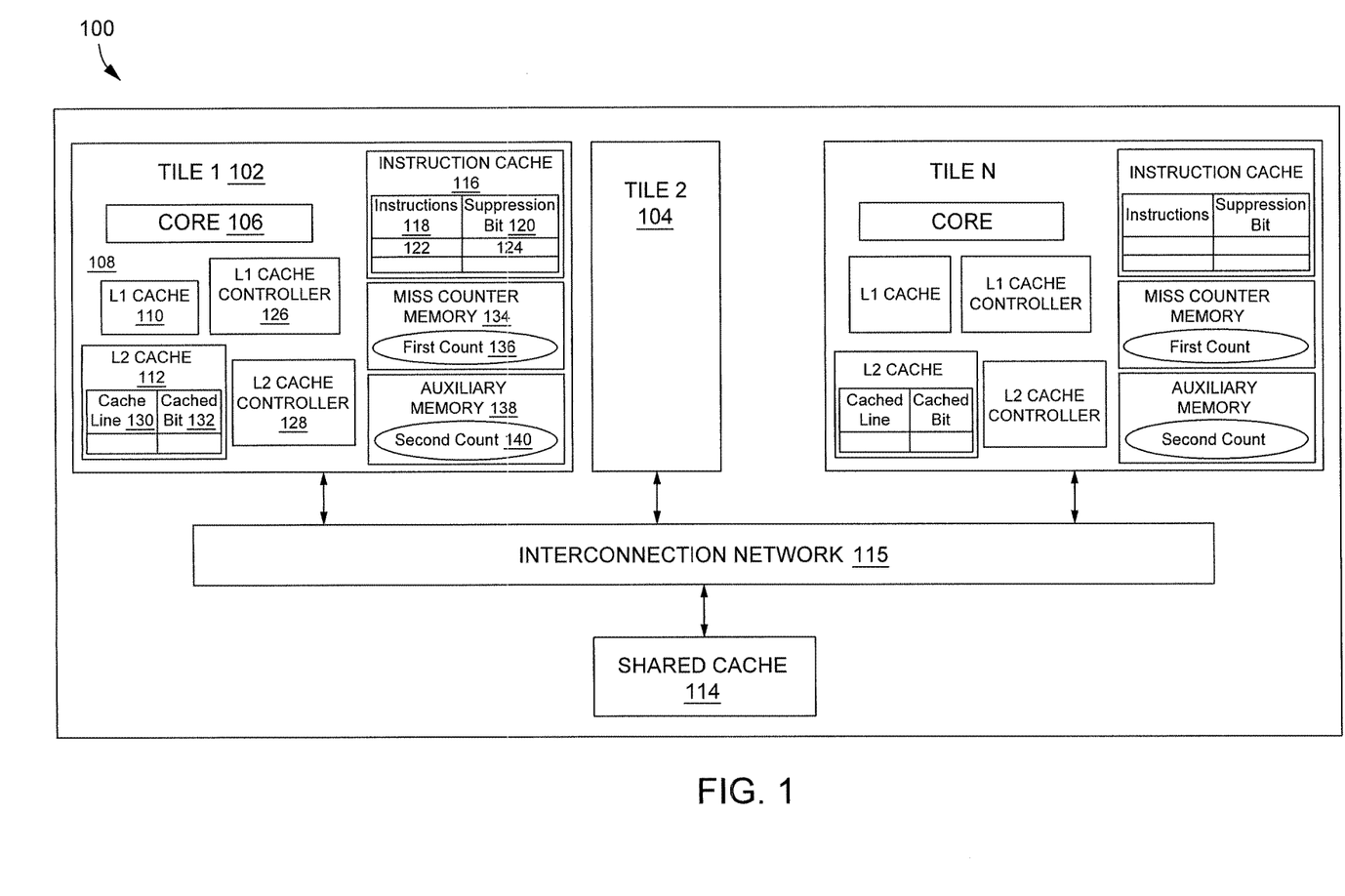
FIG. 1 is a schematic diagram which illustrates components of an example computer system.

FIG. 1 is a schematic diagram which illustrates components of an example computer system 100, arranged in accordance with at least some embodiments of the present disclosure. The computer system 100 may include a multi-core processor device. The example computer system 100 may include a plurality of tiles such as a first tile 102 and a second tile 104. Potentially, the number (N) of tiles may be any number greater than one. In some examples, the first tile 102 and the second tile 104 may have a substantially similar configuration such as in homogenous multi-core processors. In other examples, the first tile 102 and the second tile 104 may have dissimilar configurations such as in heterogeneous multi-core processors. In some examples, the present technique may be used for data retrieval in single-core processors.

Various tiles may include one or more cores configured to execute one or more instructions. For example, the first tile 102 may include a core 106. The core 106 may be a general-purpose core, a special-purpose core, an application specific core, an embedded core, a graphics core, etc. In another example, the first tile 102 may include one or more additional cores (not shown). In various other examples, the first tile 102 may include one or more cores that can be programmed during operation of the computer system 100. In some additional examples, a programmable core may correspond to a Field Programmable Gate Array (FPGA) or a Complex Programmable Logic Device (CPLD).

In some examples, tiles may further include a multi-level cache configured to receive one or more requests for cache lines. The requests may be associated with instructions executed on the core. For example, the first tile 102 may include a multi-level cache 108. The multi-level cache 108 may be configured to receive one or more requests for cache lines, wherein the requests for cache lines are associated with instructions executed on the core 106. The multi-level cache 108 may include at least a first cache and a second cache. For example, the multi-level cache 108 of the first tile 102 may include one or more private caches such as a level 1 (L1) cache 110 and a level 2 (L2) cache 112.

In some examples, a shared cache (e.g., cache 114) may be shared by multiple tiles of the multi-tile processor device, where each of the tiles (e.g., tile 102 and tile 104) may be coupled to an interconnection network 115. The interconnection network 115 may be configured to facilitate access to the shared cache (e.g., cache 114) by the tiles. The interconnection network 115 may correspond to a shared bus, a circuit-switched network-on-chip (NoC), a packet-switched network-on-chip (NoC), etc.

Various tiles may include an instruction cache that may be configured to store one or more instructions. For example, first tile 102 may include an instruction cache (e.g., cache 116) configured to store one or more instructions 118 executable by core 106. Instructions 118 stored in instruction cache 116 may be associated with a suppression status, which may be represented as one or more suppression bits (generally represented by reference numeral 120). The suppression bits may be an example indicator of a suppression status of the instructions 118, where such example is not intended to be limiting.

In some examples, instruction cache 116 may be configured to store suppression bits (such as represented by reference numeral 120). In some examples, an additional cache may be used to store the suppression bits associated with the instructions 118. In some examples, as one or more instructions are moved from instruction cache 116, their suppression bits may also be moved or discarded. In some examples, the program instructions may provide initial values for suppression bits while executing the program instructions. Such initial values may be generated by a compiler.

For example, an instruction (e.g., instruction 122) may be associated with one or more suppression bits (e.g., suppression bit 124). In some examples, a value of the one or more suppression bits (e.g., 124) may be indicative of suppression of look-up in the L1 cache (e.g., cache 110) for the instruction (e.g., instruction 122). For example, the look-up of the L1 cache 110 may be suppressed when the suppression bit 124 of the instruction 122 is SET (e.g., initialized to a value of "yes", logic 1, etc.). Other suppression status indicators are also contemplated, where the suppression status may be indicated by any reasonable means (e.g., a suppression status indicator means) such as one or more bits, Boolean values, flags, and/or text strings.

In some examples, a shared suppression prediction table may be used to indicate a suppression status of the instructions 118. In some examples, the suppression bit of the instructions may be determined using an operation code (opcode) of the respective instruction. For example, LOAD instructions that have a specific opcode may be determined to be suppressed for look-up of the L1 cache (e.g., cache 110). In some examples, the suppression bits may be determined based on a memory address. For example, certain bits of a memory address may be matched with a pattern (e.g., 101101xxxx) may be determined to be suppressed. In some examples, the suppression bits may be associated with different instructions for different cache levels.

In some examples, data access patterns of the core (e.g., core 106) may be analyzed to identify instructions that may encounter cache misses in a cache (e.g., L1 cache 110). Such instructions may be suppressed for look-up of the respective cache (e.g., L1 cache) by selecting a value of the one or more suppression bits. In some examples, the compiler may mark cache look-up as suppressed for one or more instructions. In some examples, a runtime binary optimizer may determine one or more instructions to be suppressed. In some examples, a separate hardware unit may be used to track a cache hit rate of an instruction to determine suppression status.

Each of the caches may be associated with a cache controller. For example, the L1 cache 110 may be associated with a L1 cache controller 126. The L1 cache controller 126 may be configured to receive a request for a cache line from the core 106, for example when the core 106 executes an instruction 122. The L1 cache controller 126 may be configured to determine a suppression status of the instruction 122. For example, the L1 cache controller 126 may be configured to evaluate a value of one or more suppression bits (e.g., bit 124) of the instruction (e.g., instruction 122) to determine the suppression status of the instruction 122. In some examples, the suppression bit (e.g., bit 124) of the instruction (e.g., instruction 122) may be received by the cache controller along with the request. In some examples, the controller may access another unit such as the suppression prediction buffer to determine whether the cache should be looked up or bypassed.

In some examples, when the suppression status (e.g., one or more suppression bits 124) is/are determined to be not SET (or RESET), the L1 cache controller 126 may perform a look-up in the L1 cache 110 and may provide the requested cache line to the core 106. In some examples, when the suppression status (e.g., one or more suppression bits 124) is/are determined to be SET (e.g., initialized to a value of "yes", logic 1, etc.), the L1 cache controller 126 may be configured to forward the request for the cache line to the second cache (e.g., L2 cache 112) without looking up the L1 cache.

In some examples, other techniques to indicate suppression of one or more instructions may be used. In some examples, a shared suppression prediction table may be used to indicate a suppression status of the instructions 118. In some examples, the suppression bit of the instructions may be determined using an operation code (opcode) of the respective instruction. For example, LOAD instructions that have a specific opcode may be determined to be suppressed for look-up of the L1 cache (e.g., cache 110). In some examples, the suppression bits may be determined based on a memory address. For example, certain bits of a memory address may be matched with a pattern (e.g., 101101xxxx) may be determined to be suppressed. In some examples, the suppression bits may be associated with different instructions for different cache level.

L2 cache 112 may be associated with a L2 cache controller 128. In some example embodiments, L2 cache controller 128 may be configured to determine whether the requested cache line (e.g., cache line 130) is cached by L1 cache 110. L2 cache controller 128 may be configured to make such a determination based upon a value of one or more cached bits (e.g., cached bit 132) of cache line 130 maintained within the L2 cache (e.g., cache 112).

In some examples, the cached bits (e.g., cached bit 132) may be stored in a separate RAM. Further, per-line cached bits may be replaced with per-memory-block (e.g., per-page) bits, or a hash table. In some examples, cached bits may be determined from the cache line state bits that correspond to a coherence state of the cache line. Examples of the state bits may be bits indicate whether the cache line is modified, is exclusive, or is shared.

Each of the tiles may include a miss counter memory configured to store a count of cache misses in the first cache. For example, the first tile (e.g., tile 102) may include a miss counter memory 134 associated with L1 cache 110. In one example, the miss counter memory 134 may be configured to maintain a first count 136 of cache misses in L1 cache 110 associated with an instruction (e.g., instruction 122). Miss counter memory 134 may be a fully-associative cache, a set associative cache, a direct mapped cache, or combinations thereof.

In some examples, L1 cache controller 126 may be configured to compare a value of first count 136 with a first threshold value. Further, L1 cache controller 126 may be configured to update the suppression status (e.g., update one or more suppression bits) associated with the instruction (e.g., instruction 122) to indicate suppression of look-up of L1 cache 110 for the instruction (e.g., instruction 122) based upon the comparison result. In other examples, the suppression status may be updated by a separate hardware unit based upon the comparison result.

In some examples, the system may include an auxiliary memory associated with the second cache and the second cache controller. For example, first tile 102 of computer system 100 may include an auxiliary memory 138 associated with L2 cache 112 and L2 cache controller 128. The auxiliary memory (e.g., memory 138) may be configured to maintain a second count (e.g., count 140) of a number of requests received by L2 cache 112 for a cache line. L2 cache controller 128 may be further configured to compare a value of the second count (e.g., count 140) with a second threshold. Moreover, L2 cache controller 128 may be further configured to send a message to L1 cache 110 based on the comparison result. The sent message may correspond to an un-suppression message and may indicate that L1 cache 110 for the cache line may be enabled for lookup.

It should be noted that the above arrangement of the components is purely illustrative and a variety of other arrangements and components may be envisaged. The present techniques may be applicable to multi-core computer systems with different configurations of local caches and shared caches to store data along with additional cache controllers associated with the local and shared caches. For example, the multi-core computer systems may include more than two private caches.

Figure 2:
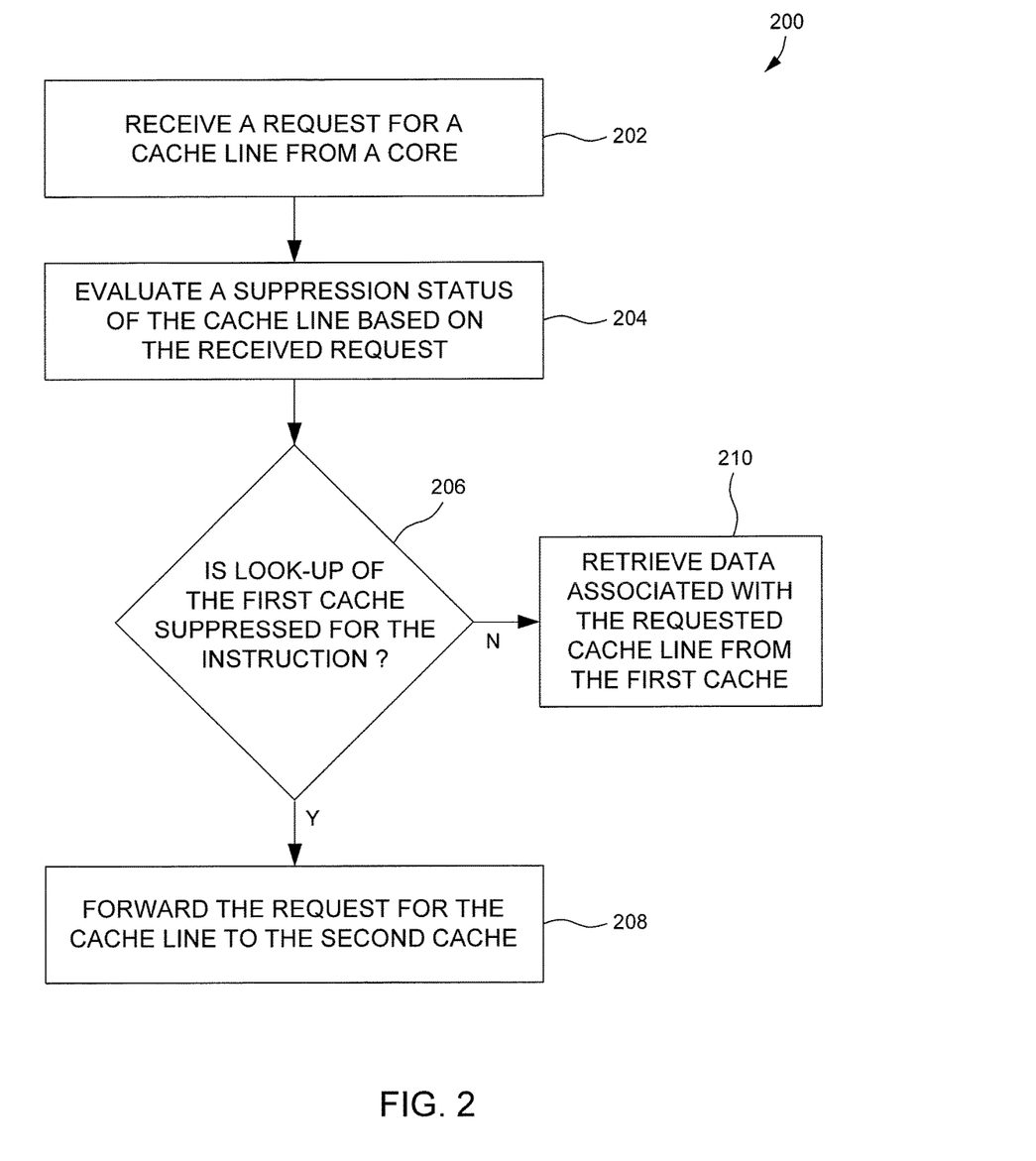
FIG. 2 is an illustration of an example process to retrieve data in a computer system with a multi-level cache.

FIG. 2 is an illustration of an example process 200 to retrieve data in a computer system with a multi-level cache, arranged in accordance with at least some embodiments described herein. Process 200 may include one or more operations, functions or actions as illustrated by one or more of blocks 202-210. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation. Process 200 may begin at block 202.

At block 202, "RECEIVE A REQUEST FOR A CACHE LINE FROM A CORE", a request for a cache line is received by a cache (e.g., L1 cache 110) of the multi-level cache of the computer system. The request may be associated with an instruction executed by a tile of the computer system. In some examples, the request may be associated with a type of instructions executed by a tile of the computer system.

In one example, a request for a cache line may be received by the L1 cache 110 of the computer system 100 of FIG. 1. In this example, the request may be associated with an instruction (e.g., instruction 122) executed on a core 106 of a tile 102 of the computer system 100. In one example, the request may correspond to a single instruction executed on a core of the computer system. In another example, the request may correspond to multiple instructions executed on a core of the computer system. In yet another example, the request may correspond to a class of instructions executed on a core of the computer system.

Processing may continue from block 202 to block 204, "EVALUATE A SUPPRESSION STATUS OF THE CACHE LINE BASED ON THE RECEIVED REQUEST". At block 204, based on the received request, a suppression status of the cache line may be evaluated by a cache controller (e.g., an L1 cache controller) to determine whether the look-up of the L1 cache is suppressed for the received request.

In various examples, the received request may correspond to an instruction that generated the cache line. In other examples, the received request may correspond to multiple instructions, or a class of instructions executed on a core of the computer system. In some examples, a cache controller (e.g., L1 cache controller) may be configured to evaluate the value of the suppression status associated with the received request to determine when the look-up of the corresponding cache (e.g., L1 cache) is suppressed. In some additional examples, a value associated with the suppression status corresponds to a value of one or more suppression bits associated with the received request, which may be evaluated by a cache controller (e.g., L1 cache controller, L2 cache controller, etc.).

In some examples, an L1 cache controller 126 may be configured to evaluate the value of one or more suppression bits (e.g., suppression bit 124) associated with an instruction (e.g., instruction 122) to determine whether lookup of the L1 cache 110 is suppressed for the corresponding instruction.

In some additional examples, other suppression status indicators such as Boolean values and text strings, may be evaluated by a cache controller (e.g., L1 cache controller, a L2 cache controller, a memory controller) to determine whether lookup of the L1 cache is suppressed for the corresponding instructions or a set of instructions. In some examples, a shared suppression prediction table may be used to indicate a suppression status of the instructions 118. In some examples, the suppression bit of the instructions may be determined using an operation code (opcode) of the respective instruction. For example, LOAD instructions that have a specific opcode may be determined to be suppressed for look-up of the L1 cache (e.g., cache 110). In some examples, the suppression bits may be determined based on a memory address. For example, certain bits of a memory address may be matched with a pattern (e.g., 101101xxxx) may be determined to be suppressed. In some examples, the suppression bits may be associated with different instructions for different cache level.

Processing may continue from block 204 to block 206, "IS LOOK-UP OF A FIRST CACHE SUPPRESSED FOR THE CACHE LINE? BASED ON THE SUPPRESSION STATUS". At block 206, a cache controller (e.g., a first cache controller) may determine if the look-up of the first cache is suppressed for the instruction(s) associated with the received requests. The cache controller may make such determination based on the evaluation of the suppression status of the cached line. In some examples, the controller may access another unit such as a suppression prediction buffer to determine whether the cache should be looked up or bypassed.

When the look-up of the first cache is determined to be suppressed, processing may continue from block 206 to block 208, "FORWARD THE REQUEST FOR THE CACHE LINE TO A SECOND CACHE". At block 206, when it is determined that the look-up of the first cache is suppressed, the request for the cache line may be forwarded by the cache controller (e.g., the first cache controller) to a second cache (e.g., the L2 cache) of the multi-level cache by the first cache controller.

In some examples, the request for the cache line may be forwarded to a second cache (e.g., L2 cache 112) when the value of the suppression status (e.g., suppression bit(s)) associated with the instruction(s) associated with the received request is SET (e.g., initialized to a value of "yes", logic 1, etc.) to indicate the suppression of look-up of the first cache (e.g., L1 cache 110) for the instruction. In some examples, the second cache may be at a lower level than the first cache in a cache hierarchy of the processor. The cache hierarchies described herein may include any number of hierarchical layers. For example, an L1 and L2 hierarchy or an L2 and L3 hierarchy).

In one example, when it is determined that a value of the one or more suppression bits (e.g., suppression bit 124) associated with the instruction (e.g., instruction 122) is SET, the L1 cache controller 126 forwards the request for the cache line corresponding to the instruction 122 to the L2 cache 112.

When the look-up of the first cache is determined to be unsuppressed, processing may continue from block 206 to block 210, "RETRIEVE DATA ASSOCIATED WITH THE REQUESTED CACHE LINE FROM THE FIRST CACHE". At block 208, when it is determined that the suppression status (e.g., one or more suppression bits) of the corresponding instruction is not SET (or RESET), the data associated with the requested cache line may be retrieved from the first cache (e.g., L1 cache). For example, when it is determined that the look-up of the L1 cache 110 is not suppressed, and then the data associated with the cache line may be retrieved from the L1 cache 110. In another example, when it is determined that the suppression status (e.g., Boolean values) of the corresponding instruction is not SET (or RESET), the data associated with the requested cache line may be retrieved from the first cache (e.g., L1 cache).

Figure 3:
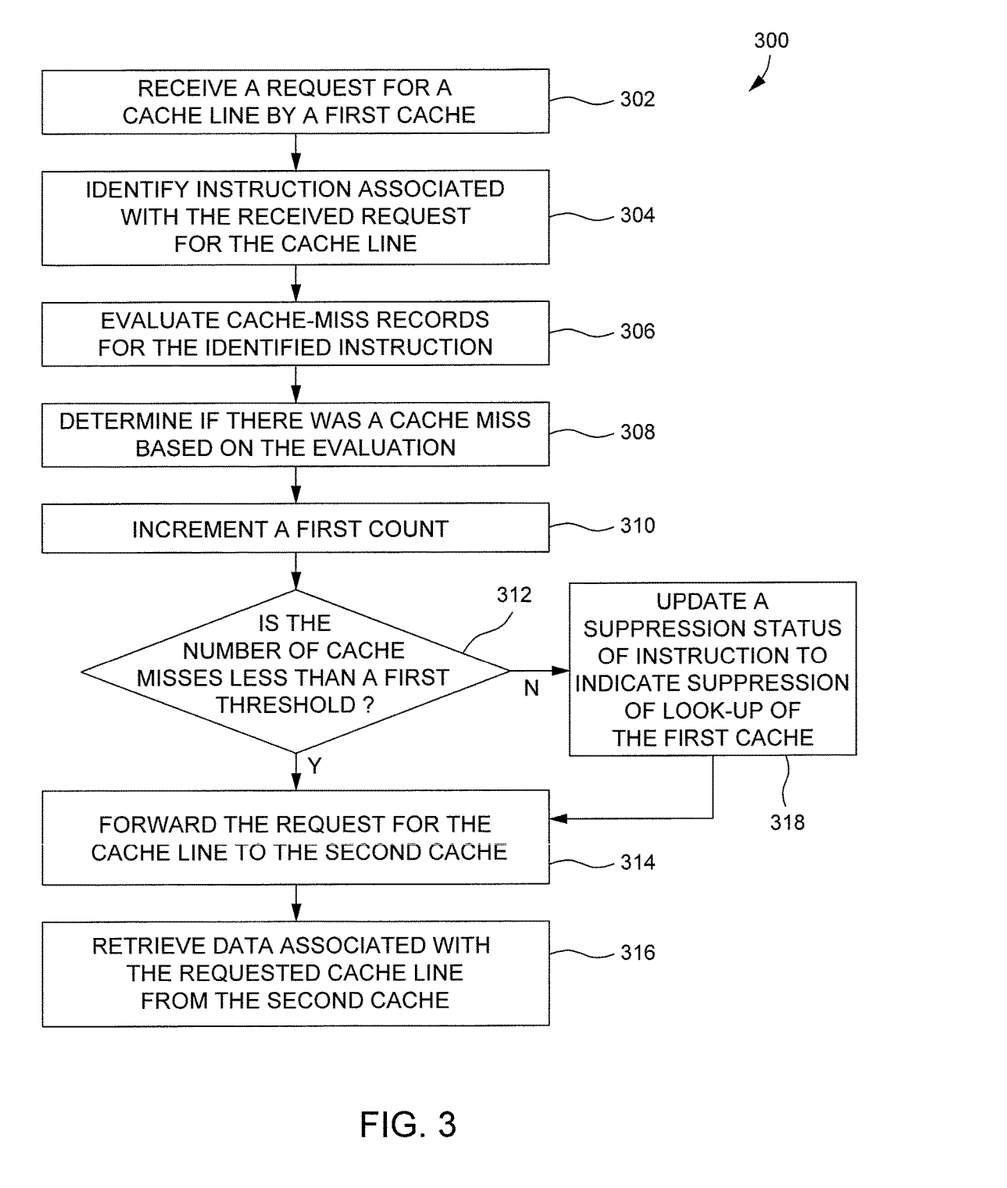
FIG. 3 is an illustration of another example process to retrieve data in a computer system with a multi-level cache.

FIG. 3 is an illustration of another example process 300 to retrieve data in an example computer system (e.g., computer system 100 of FIG. 1), arranged in accordance with at least some embodiments described herein. Process 300 may include one or more operations, functions or actions as illustrated by one or more of blocks 302-318. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation. Process 300 may begin at block 302.

At block 302, "RECEIVE A REQUEST FOR A CACHE LINE BY A FIRST CACHE", a request for a cache line may be received by a cache of a multi-level cache of a computer system. In some examples, the request may be associated with an instruction executed on a tile of the computer system. In some other examples, the request may be associated with multiple instructions executed on a tile of the computer system. In some other examples, the request may be associated with a class of instructions executed on the tile of the computer system.

In some examples, the request for the cache line may be received by a first cache (e.g., L1 cache, L2 cache, L3 cache) of the computer system. For example, a request for a cache line may be received by the L1 cache 110 of FIG. 1. The request may be associated with an instruction (e.g., instruction 122) executing on a tile (e.g., tile 102) of the computer system 100.

Processing may continue from block 302 to block 304, "IDENTIFY INSTRUCTION ASSOCIATED WITH THE RECEIVED REQUEST FOR THE CACHE LINE" At block 304, a cache controller (e.g., L1 cache controller) associated with the first cache may identify the instruction(s) associated with the received request for the cache line. In some examples, the cache controller may identify multiple instructions or a class of instructions associated with the received request for the cache line.

In some examples, a first cache controller (e.g., the L1 cache controller 126) associated with the first cache (e.g., L1 cache 110) of the computer system 100 may identify the instruction(s) (e.g., instruction 122) associated with the received request for the cache line.

When the instruction(s) associated with the received request are identified, processing may continue from block 304 to block 306, "EVALUATE CACHE-MISS RECORDS FOR THE IDENTIFIED INSTRUCTION". At block 306, a cache controller (e.g., L1 cache controller) may evaluate the cache-miss records of the first cache for the identified instruction. The cache-miss records for the identified instruction may be stored in a memory (e.g., miss counter memory).

In one example, the first cache controller (e.g., L1 cache controller 126) may evaluate the cache-miss records of the first cache (e.g., L1 cache 110) for the identified instruction. The cache-miss records for the identified instruction may be stored in a miss counter memory (e.g., memory 134)

Processing may continue from block 306 to block 308, "DETERMINE IF THERE WAS A CACHE MISS BASED ON THE EVALUATION". At block 308, a cache controller may determine if there was a previous cache miss in the first cache corresponding to the instruction that generated the request for the cache line. In some examples, the cache controller may look-up a memory (e.g., miss counter memory) to evaluate a count value of cache misses in first cache associated with an identified instruction. The cache controller may determine if there was a cache miss based on such evaluation. Further, data associated with the requested cache line may be retrieved from the first cache when it is determined that there was no cache miss in the first cache.

In some examples, where the first cache is the L1 cache, the L1 cache controller (e.g., cache controller 126) may determine whether there was a cache miss in L1 cache 110 for the instruction (e.g., instruction 122) corresponding to the requested cache line. The L1 cache controller may look-up the miss counter memory 134 to evaluate a first count value (e.g., count 136) of cache misses in the L1 cache 110 associated with an instruction (e.g., instruction 122). The L1 cache controller may determine if there was a cache miss based on such evaluation. Further, data associated with a requested cache line corresponding to an instruction (e.g., instruction 122) executing on a tile (e.g., tile 102) may be retrieved from the L1 cache 110.

When it is determined that there was a cache miss in the first cache, processing may continue from block 308 to block 310, "INCREMENT A FIRST COUNT". At block 310, a cache controller (e.g., the first cache controller) may increment a first count when a cache miss is encountered in the first cache corresponding to the requested cache line. The first count of the cache misses in the first cache may be stored a memory (e.g., a miss counter memory).

For example, the L1 cache controller 126 associated with the L1 cache 110 may increment the first count (e.g., count 136) maintained in the miss counter memory (e.g., memory 134) when the cache miss is encountered in the L1 cache 110.

Processing may continue from block 310 to block 312, "IS THE NUMBER OF CACHE MISSES LESS THAN A FIRST THRESHOLD". At block 312, the number of cache misses corresponding to the instruction may be compared with a first threshold. In some examples, a value of the first count may be compared with a first threshold by the first cache controller. The first cache controller may retrieve the value of the first count from the memory (e.g., the miss counter memory). The first threshold may be configurable by a user of the system.

For example, the L1 cache controller 126 may look-up a value of a first count (e.g., count 136) of cache misses encountered in the L1 cache 110 by an instruction (e.g., instruction 122). The first count 136 may be maintained in a miss counter memory (e.g., memory 134). The value of the first count 136 may be compared with the first threshold.

When the first count of cache misses in the first cache is less than the threshold, processing may continue from block 312 to block 314, "FORWARD THE REQUEST FOR THE CACHE LINE TO THE SECOND CACHE". At block 314, the cache controller (e.g., the first cache controller) may forward the request for the cache line to a second cache (e.g., L2 cache, or a L3 cache) when the value of the first count is less than the first threshold. Further, data associated with the cache line may be retrieved from the second cache (block 316). In some examples, when the second cache does not have the cache line, the cache line may be retrieved from a lower level cache, such as a shared cache, or from a main memory.

For example, when it is determined that the first count of cache misses in the L1 cache 110 is less than the threshold, the request for data corresponding to the instruction (e.g., instruction 122) may be forwarded to the L2 cache 112. The data associated with the cache line may be retrieved from the L2 cache 112.

When it is determined that the value of the first count is equal to or greater than the threshold, processing may continue from block 312 to block 318, "UPDATE A SUPPRESSION STATUS OF INSTRUCTION TO INDICATE SUPPRESSION OF LOOK-UP OF THE FIRST CACHE". At block 316, the first cache controller may update a suppression status of the instruction when the value of the first count is equal to or above the first threshold. In some examples, one or more suppression bits of the instruction may be updated when the value of the first count is equal to or above the first threshold. The suppression bit of the instruction may be updated by the first cache controller to indicate suppression of lookup of the first cache for the instruction. Look-up of the first cache may be suppressed to prevent look-up of the first cache when the corresponding instruction is executed subsequently by a core.

In some other examples, other suppression indicators such as Boolean values, flags, and text strings may be updated by the cache controller to indicate suppression of lookup of the first cache for the instruction. In some examples, a shared suppression prediction table may be used to indicate a suppression status of the instructions 118. In some examples, the suppression bit of the instructions may be determined using an operation code (opcode) of the respective instruction. For example, LOAD instructions that have a specific opcode may be determined to be suppressed for look-up of the L1 cache (e.g., cache 110). In some examples, the suppression bits may be determined based on a memory address. For example, certain bits of a memory address may be matched with a pattern (e.g., 101101xxxx) may be determined to be suppressed. In some examples, the suppression bits may be associated with different instructions for different cache level.

In some examples, the suppression bit (e.g., bit 124) associated with the instruction (e.g., instruction 122) may be updated to indicate the suppression of the look-up of the L1 cache 110 and the request for the cache line (e.g., cache line 130) may be forwarded to the L2 cache 112. The request for cache line may be forwarded by the L1 cache controller to the L2 cache (block 314) and the cache line may be retrieved from the L2 cache 112 (block 316).

In various examples, a second cache controller may determine a cached status of the requested cache line to determine whether the requested cache line is cached by the first cache. The second cache controller may determine a value of a cached bit for the cache line. The cached bit for a cache line stored in the second cache may be maintained by the second cache. In some examples, other techniques may be used to determine cache lines that are available in the first cache and for which the requests are forwarded to the second cache without performing a lookup of the first cache.

For example, the L2 cache controller (e.g., cache controller 128) may evaluate the value of the cached bit (e.g., cached bit 132) associated with the cache line (e.g., cache line 130) to determine whether the cache line (e.g., cache line 130) is also cached in the first cache (e.g., cache 110).

The second cache controller may increment a second count of a number of requests for a cache line that are forwarded to the second cache without looking up the first cache that stores the respective cache line. The second count may be maintained in an auxiliary memory (e.g., auxiliary memory 138).

For example, the second count (e.g., count 140) may be maintained in the auxiliary memory (e.g., memory 138) associated with the L2 cache (e.g., cache 112). The second count 140 may be updated by the L2 cache controller (e.g., cache controller 128) based upon a number of requests received by the L2 cache 112 for a respective cache line.

In some examples, the second cache controller may determine if an instruction should be unsuppressed for look-up of the first cache. The second cache controller may compare the value of the second count with a second threshold. For example, the value of the second count (e.g., 140) stored in the auxiliary memory (e.g., memory 138) may be retrieved by the L2 cache controller (e.g., cache controller 128) and the retrieved value may be compared with the second threshold.

The un-suppression message for the instruction may be sent to the first cache by the first cache controller when it is determined that the value of the second count is above the second threshold. The un-suppression message sent to the first cache may indicate that lookup of the first cache for the instruction is enabled. Further, a suppression status indicator (such as one or more suppression bits) of the corresponding instruction may be updated by the respective tile to indicate the un-suppression of the look-up of the first cache for the instruction. In some examples, the second count may be RESET once the suppression bit of the instruction is updated.

The example techniques described herein may be used for retrieving data in computer systems having multi-level caches. The techniques may improve power consumption of such systems by eliminating unnecessary cache lookups of individual caches (e.g., L1 caches). As described above, cache look-ups for certain instructions may be suppressed based on data reuse frequency information per instruction.

Figure 4:
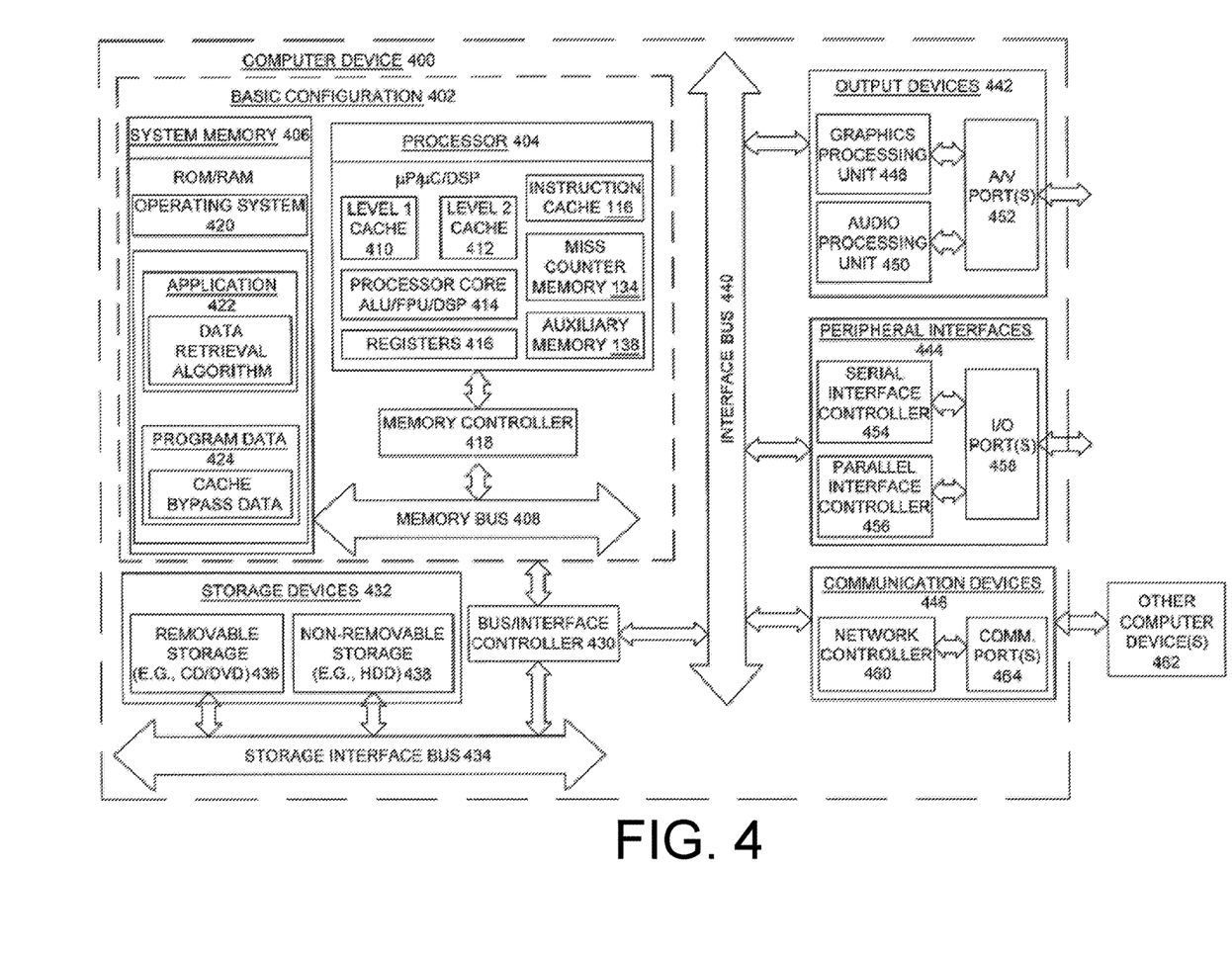
FIG. 4 is a block diagram which illustrates an example computer device that is arranged for managing data retrieval in a multi-level cache system.

FIG. 4 is a block diagram which illustrates an example computer system 400 that is arranged for retrieving data in a multi-core processor in accordance with at least some embodiments of the present disclosure. In a very basic configuration 402, the computer system 400 typically includes one or more processors/tiles 404 (such as tile 102 of FIG. 1) and a system memory 406. A memory bus 408 may be used for communicating between processor 404 and system memory 406. The processor 404 includes a multi-core processor.

Depending on the desired configuration, processor 404 may be of any type including but not limited to a microprocessor (μP), a microcontroller (μC), a digital signal processor (DSP), or any combination thereof. Processor 404 may include one or more levels of caching, such as a level one cache 410 and a level two cache 412, two or more processor cores 414, and registers 416. Each of the processor 404 may include one or more processor cores 414 configured to execute one or more instructions. Processor 404 may include an instruction cache 116 and a miss counter memory 134 associated with level one cache 410 and an auxiliary memory 138 associated with level two cache 412. The instruction cache 116 may be configured to store one or more instructions 118 and associated suppression bits 120.

During operation, as the level one cache 410 receives a request for a cache line, a suppression status such as one or more suppressions bit 120 of one or more instructions associated with the received request may be evaluated by a cache controller (e.g., L1 cache controller) associated with the level one cache 410. The suppression status may be evaluated by the cache controller to determine whether the look-up of the level one cache 410 is suppressed. Further, the request for the cache line may be forwarded to the level two cache 412 by the cache controller when it is determined that the look-up of the level one cache 410 is suppressed.

An example processor core 414 may include an arithmetic logic unit (ALU), a floating point unit (FPU), a digital signal processor core (DSP core), or any combination thereof. An example memory controller 418 may also be used with processor 404, or in some implementations, memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. In some embodiments, application 422 may be arranged to operate with program data 424 on operating system 420. This described basic configuration 402 is illustrated in FIG. 4 by those components within the inner dashed line. Application 422 may include a data retrieval algorithm for retrieving data from the multi-level cache. Program data 424 may include cache bypass data such as suppression bits associated with one or more instructions executed by the processor core 414.

The data retrieval algorithm may be arranged to operate with the cache bypass data such as suppression status associated with one or more instructions executed on the processor cores 404. In some examples, when the suppression status (e.g., one or more suppression bits 120) is/are determined to be not SET (or RESET), the cache controller may perform a look-up in the L1 cache 410 and may provide the requested cache line to the requesting core. In some examples, when the suppression status (e.g., one or more suppression bits 120) is/are determined to be SET (e.g., initialized to a value of "yes", logic 1, etc.), the cache controller may be configured to forward the request for the cache line to the L2 cache 412. Other suppression status indicators are also contemplated, where the suppression status may be indicated by any reasonable means (e.g., a suppression status indicator means) such as one or more bits, Boolean values, flags, text strings, etc.

Computer system 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof.

Examples of removable storage and non-removable storage devices include magnetic disk devices such as flexible disk drives and hard-disk drives (HDD), optical disk drives such as compact disc (CD) drives or digital versatile disc (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which may be used to store the desired information and which may be accessed by computer system 400. Any such computer storage media may be part of computer system 400.

Computer system 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processor unit 448 and an audio processor unit 450, which may be configured to communicate to various external devices such as a display or speakers via one or more A/V ports 452.

Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computer devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computer system 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computer system 400 may also be implemented as a personal computer including both laptop computer and non-laptop computer configurations.

Figure 5:
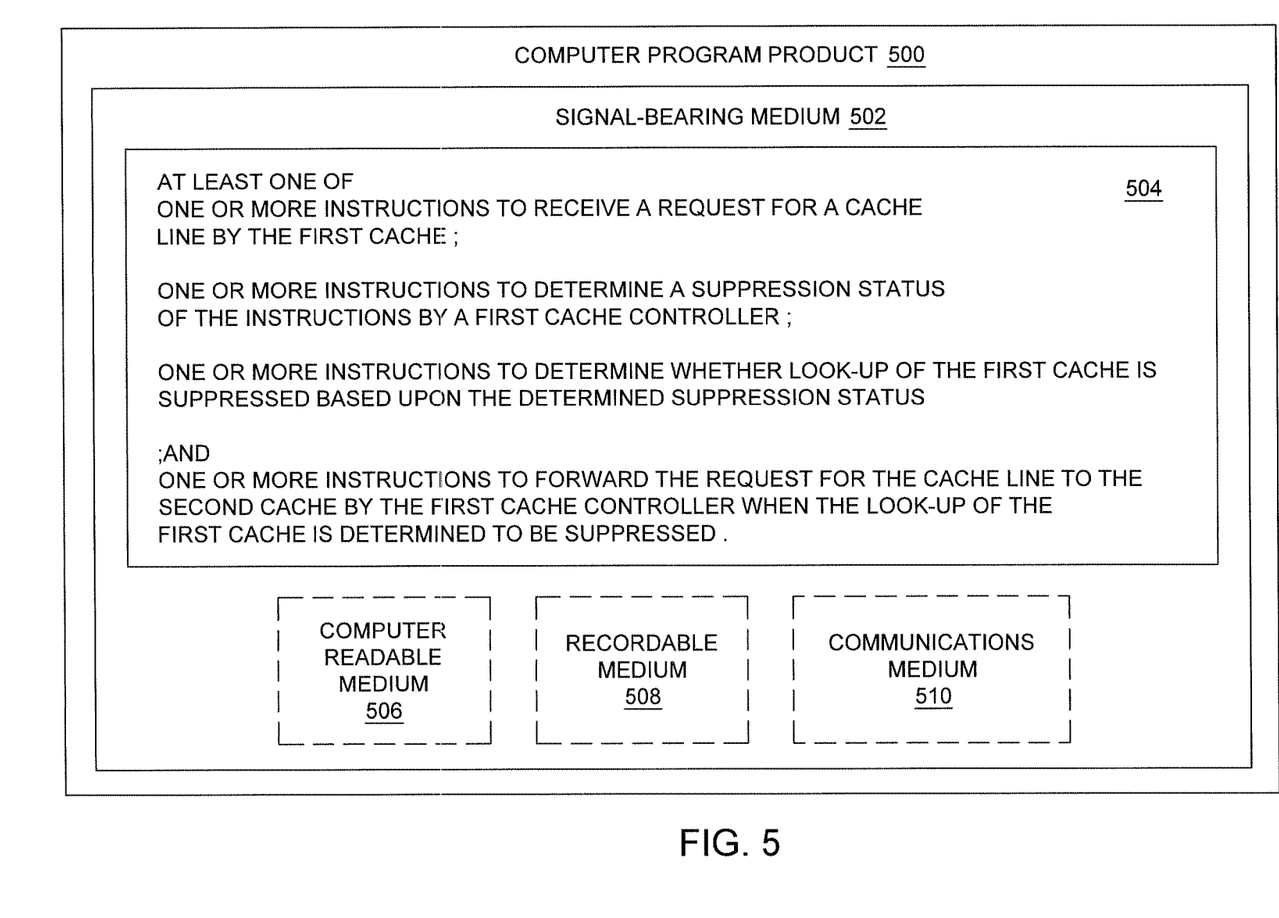
FIG. 5 is an example computer program product that may be utilized to implement data retrieval in computer systems with multi-level caches, all arranged in accordance with at least some embodiments of the present disclosure.

FIG. 5 illustrates an example computer program product that can be utilized to implement data retrieval in computer systems having multi-level caches, arranged in accordance with at least some embodiments described herein. Computer program product 500 may include a signal bearing medium 502. Signal bearing medium 502 may include one or more instructions 504 that, in response to execution by, for example, a processor, may provide the features described above with respect to FIGS. 1-4. Thus, for example, referring to computer system 100, tile 102 may undertake or cause to be undertaken the operations depicted in one or more of the blocks shown in FIG. 5 in response to instructions 504 conveyed to the computer system 100 by signal bearing medium 502 and then executed.

In some implementations, signal bearing medium 502 may encompass a non-transitory computer-readable medium 506, such as, but not limited to, a hard disk drive (HDD), a Compact Disc (CD), a Digital Video Disc (DVD), a digital tape, memory, etc. In some implementations, signal bearing medium 502 may encompass a recordable medium 608, such as, but not limited to, memory, read/write (R/W) CDs, R/W DVDs, etc. In some implementations, signal bearing medium 502 may encompass a communication medium 510, such as, but not limited to, a digital and/or an analog communication medium (e.g., a fiber optic cable, a waveguide, a wired communication link, a wireless communication link, etc.). Thus, for example, computer program product 500 may be conveyed to one or more modules of the system 100 by an RF signal bearing medium 502, where the signal bearing medium 502 is conveyed by a wireless communications medium 510 (e.g., a wireless communication medium conforming with the IEEE 802.11 standard).

The present disclosure is not to be limited in terms of the particular embodiments described in this application, which are intended as illustrations of various aspects. Many modifications and variations may be made without departing from its spirit and scope. Functionally equivalent methods and apparatuses within the scope of the disclosure are contemplated herein. Such modifications and variations are intended to fall within the scope of the appended claims.

The present disclosure is to be limited only by the terms of the appended claims, along with the full scope of equivalents to which such claims are entitled. Furthermore, this disclosure is not limited to particular methods, reagents, compounds compositions or biological systems, which can, of course, vary. Moreover, the terminology used herein is for the purpose of describing particular embodiments only, and is not intended to be limiting.

With respect to the use of substantially any plural and/or singular terms herein, the plural may be translated to the singular and the singular may be translated to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Additionally, if a specific number of an introduced claim recitation is intended, such an intent will be explicitly recited in the claim, and in the absence of such recitation, no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such a recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

Additionally, virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

For any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc.

All language such as "up to," "at least," "greater than," "less than," and the like include the number recited and refer to ranges which can be subsequently broken down into sub-ranges as discussed above. Finally, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments are contemplated as falling within the ambit of the following claims. The various aspects and embodiments disclosed herein are for purposes of illustration and are not intended to be limiting, with the true scope and spirit being indicated by the following claims.

The invention claimed is:

1. A method to retrieve data in a computer system with a multi-level cache, wherein the multi-level cache includes at least a first cache and a second cache, the method comprising:

identifying a request for a cache line, wherein the request is associated with an instruction executed by a tile of the computer system;

determining, by a first cache controller, a suppression status of the instruction;

determining whether a look-up of the first cache is suppressed based upon the determined suppression status;

forwarding, by the first cache controller, the request for the cache line to the second cache after the look-up of the first cache is determined to be suppressed;

maintaining a first count, wherein the first count indicates a number of cache misses associated with the instruction;

incrementing the first count after the instruction accesses the first cache and encounters a cache miss in the first cache;

comparing a first value of the first count with a first threshold value; and updating the suppression status of the instruction to indicate suppression of the look-up of the first cache if the first value of the first count equals or exceeds the first threshold value.

2. The method of claim 1, wherein determining the suppression status comprises evaluating, by the first cache controller, one or more suppression bits of the instruction.

3. The method of claim 2, wherein evaluating the one or more suppression bits of the instruction comprises determining, by the first cache controller, an operation code of the instruction.

4. The method of claim 2, wherein evaluating the one or more suppression bits of the instruction comprises determining, by the first cache controller, a memory address of the instruction.

5. The method of claim 1, wherein forwarding the request to the second cache comprises forwarding the request to a lower level cache relative to the first cache.

6. The method of claim 1, wherein maintaining the first count comprises maintaining the first count in a miss counter memory coupled to the first cache.

7. The method of claim 6, further comprising:
determining whether the instruction experienced a previous cache miss based on the first value of the first count;
comparing the first value of the first count with the first threshold value; and
updating the suppression status of the instruction to indicate suppression of the look-up of the first cache if a current value of the first count equals or exceeds the first threshold value.

8. The method of claim 1, further comprising:
maintaining a cached bit for the cache line in the second cache, wherein the cached bit is indicative of whether the cache line is cached by the first cache;
evaluating the cached bit to determine whether the cache line is cached by the first cache; and
sending an un-suppression message to the tile to update the suppression status of the instruction after the cache line is cached by the first cache.

9. The method of claim 8, wherein sending the un-suppression message comprises:
maintaining a second count of a number of requests received by the second cache for the cache line;
comparing a second value of the second count with a second threshold value; and
based on the comparison of the second value of the second count with the second threshold value, sending the un-suppression message to the first cache.

10. The method of claim 9, wherein sending the un-suppression message comprises sending the un-suppression message to the first cache if the second value of the second count is greater than or equal to the second threshold value.

11. The method of claim 9, wherein maintaining the second count comprises maintaining the second count in an auxiliary memory coupled to the second cache.

12. A computer system, comprising:
a core configured to execute one or more instructions;
a multi-level cache that includes at least a first cache and a second cache, wherein the multi-level cache is configured to receive a request for a cache line, and wherein the request is associated with an instruction executed on the core;
a first cache controller associated with the first cache, wherein the first cache controller is configured to determine a suppression status of the instruction and to forward the request for the cache line to the second cache based upon the determined suppression status of the instruction; and
a second cache controller associated with the second cache, wherein the second cache controller is configured to determine whether the cache line is cached by the first cache based upon a cached bit of the cache line and to send an un-suppression message to the first cache controller to update the suppression status of the instruction after the cache line is cached by the first cache.

13. The computer system of claim 12, wherein the first cache controller is configured to evaluate one or more suppression bits of the instruction to determine the suppression status of the instruction.

14. The computer system of claim 13, wherein the first cache controller is configured to determine whether a look-up of the first cache is suppressed based upon a value of the one or more suppression bits.

15. The computer system of claim 12, wherein the first cache comprises a private cache and the second cache comprises a shared cache.

16. The computer system of claim 12, further comprising a miss counter memory associated with the first cache and the first cache controller, wherein the miss counter memory is configured to maintain a first count of cache misses associated with the instruction.

17. The computer system of claim 16, wherein the miss counter memory comprises one or more of a fully-associative cache, a set associative cache, a direct mapped cache, or combinations thereof.

18. The computer system of claim 16, wherein the first cache controller is configured to:
increment the first count after the instruction has a cache miss in the first cache;
compare a value of the first count with a first threshold value; and
based on a result of the comparison, update the suppression status of the instruction to indicate suppression of a look-up of the first cache.

19. The computer system of claim 12, wherein the second cache controller is configured to send the un-suppression message to the first cache controller to update one or more suppression bits of the instruction after the cache line is cached by the first cache, wherein the computer system further comprises an auxiliary memory associated with the second cache and the second cache controller, and wherein the auxiliary memory is configured to:
maintain a count of a number of requests received by the second cache for the cache line;
compare a value of the count with a threshold value; and
send the un-suppression message to the first cache based on a result of the comparison.

20. A tile, comprising:
a plurality of cores, wherein each of the plurality of cores comprises:
a multi-level cache that includes at least a first cache and a second cache, wherein the multi-level cache is configured to receive a request for a cache line; and
a first cache controller associated with the first cache, wherein the first cache controller is configured to:
determine a suppression status of an instruction and to forward the request for the cache line to the second cache, evaluate one or more suppression bits associated with the instruction so as to determine the suppression status of the instruction, and determine an operation code of the instruction so as to evaluate the one or more suppression bits associated with the instruction.

21. The tile of claim 20, wherein the first cache controller is configured to evaluate the one or more suppression bits, Boolean values, text strings, or combinations thereof associated with the instruction so as to determine the suppression status of the instruction.

22. The tile of claim 20, further comprising a second cache controller associated with the second cache, wherein the second cache controller is configured to determine if the cache line is cached by the first cache based upon a cached bit of the cache line.

23. The tile of claim 20, further comprising a miss counter memory associated with the first cache and the first cache controller, wherein the miss counter memory is configured to maintain a first count of a number of cache misses associated with the instruction, and wherein the first cache controller is configured to:

increment the first count after the instruction accesses the first cache and encounters a cache miss in the first cache;

compare a value of the first count with a first threshold value; and update the suppression status of the instruction to indicate suppression of a look-up of the first cache if the first count equals or exceeds the first threshold value.

* * * * *